United States Patent [19]

Montagna et al.

[11] 3,997,426
[45] Dec. 14, 1976

[54] PROCESS FOR THE CONVERSION OF CARBONACEOUS MATERIALS

[75] Inventors: Angelo A. Montagna, Monroeville; Howard G. McIlvried, McCandless Township, both of Pa.

[73] Assignee: Gulf Research & Development Company, Pittsburgh, Pa.

[22] Filed: Apr. 10, 1975

[21] Appl. No.: 566,934

[52] U.S. Cl. ............................................. 208/10
[51] Int. Cl.² ........................................ C10G 1/08
[58] Field of Search ................................ 208/10

[56] References Cited
UNITED STATES PATENTS

| | | | |
|---|---|---|---|
| 1,934,023 | 11/1933 | Wright | 208/10 |
| 1,950,309 | 3/1934 | Jennings | 208/10 |
| 3,575,847 | 4/1971 | Sprow et al. | 208/10 |

*Primary Examiner*—Delbert E. Gantz
*Assistant Examiner*—James W. Hellwege

[57] ABSTRACT

A process is provided for the conversion (including upgrading) of solid carbonaceous materials, in particular for the hydrogenation of coal slurries. The process comprises passing a slurry composed of solid carbonaceous material and solvent, together with hydrogen, through the void spaces of a fixed catalyst bed wherein the total void volume is within defined critical limits.

12 Claims, 7 Drawing Figures

PROCESS FOR THE CONVERSION OF CARBONACEOUS MATERIALS

BACKGROUND OF THE INVENTION

1. Field of the Invention

The treatment of solid carbonaceous materials, especially finely comminuted solid carbonaceous materials, such as coal, to produce upgraded products has been under study for many years. Since coal reserves represent one of the largest sources of energy supply in the world, much attention has been directed to devising and developing processes for conversion and/or upgrading coal. Efforts have been directed, for example, to thermally treating coal slurries to produce upgraded products. While the thermal treatment of coal slurries has resulted in the production of some upgraded products, certain undesirable characteristics are encountered in conventional thermal processes. One undesirable characteristic encountered in a thermal process is the low yield of liquid product. Conventional thermal treatment, for example, of coal results not only in a low yield of liquid product but also in a liquid product of low quality. Difficulty has also been encountered in filtering ash and unreacted coal from viscous liquid products obtained in thermally treating coal slurries. While attempts have been made to upgrade and/or improve the yield of desirable liquid products by contacting the thermally-obtained viscous liquid products containing small amounts of ash and unreacted coal with a catalyst in an ebullating bed reactor, the products from the ebullating bed reactor similarly contain ash, solid coal and, in addition, solid catalytic material which is entrained in the liquid product. Again, difficulty is encountered in separating these solids from the desirable improved products. Further attempts have been made to improve coal treating processes by eliminating the initial thermal treatment. In such instances, the coal slurry without prior treatment is introduced into a catalyst-containing ebullating bed reactor. Similar separating problems are encountered in this situation, but, perhaps the most serious problem is the removal and recovery of catalyst and catalyst fines from the resulting product stream and solid-ash-containing stream.

Fixed-bed reactors have been developed to avoid the attrition and catalyst recovery problems encountered with the ebullating bed reactor, but, because of the normal tendency of carbonaceous materials to form deposits upon conversion, fixed-bed reactors tend to plug very quickly, creating pressure drops far greater than can be tolerated in commercially attractive catalytic conversion processes.

2. Description of the Prior Art.

U.S. Pat. No. 2,985,582 to Oettinger discloses the removal of ash from crude oils, tars and their residue by heating said materials to a temperature of at least 250° C. and then contacting the heated material with large-surfaced substances. In U.S. Pat. No. 3,575,847 Sprow et al subject the liquid product from a coal liquefaction zone to hydrocracking in the presence of spherical hydrogenation catalysts. Rieve et al in U.S. Pat. No. 3,635,814 subject coal to hydrogenation in the presence of catalyst solids having a rough surface or large pores.

SUMMARY OF THE INVENTION

This invention relates to an improved process for the conversion (including upgrading) of carbonaceous materials that are substantially solid at room temperature, particularly coal, to give an improved product, particularly an improved liquid product. The invention relates especially to an improved process for hydrogenating solid carbonaceous materials which tend to form deposits such as coke and/or ash during conversion. The term "conversion" includes processes wherein a solid carbonaceous material, essentially hydrocarbon in nature, as defined herein, is changed in accordance with the process defined and claimed herein, physically and/or chemically, to another distinct species, as, for example, the change that occurs as a result of the hydrogenation of coal to a liquid. The term "upgrading" includes treatment of the solid carbonaceous material which results in a product having enhanced physical and/or chemical properties, as, for example, wherein some of the solid carbonaceous material, although not liquefied during processing, has a lower sulfur or nitrogen content and/or wherein the liquid obtained is lower in sulfur or nitrogen content.

In accordance with the present invention, an improved process is provided for the conversion of solid carbonaceous materials normally tending to form deposits, such as coke and/or ash, during the conversion of said carbonaceous materials which comprises passing a slurry composed of solid carbonaceous material and solvent, together with hydrogen, through the void spaces of a fixed catalyst bed wherein the total void volume (defined hereinafter) is within defined critical limits, whereby effective conversion of said solid carbonaceous materials is obtained without appreciable increase in pressure drop across the catalyst bed.

The process defined and claimed herein can be carried out over prolonged periods of time to obtain conversions substantially comparable to those obtained in the conventional fixed-bed operation. In particular, operation in accordance with the process of this invention results in an improved process for the conversion of solid carbonaceous materials over prolonged periods of time to produce improved yields of high quality products while simultaneously avoiding an excessive pressure drop in the reaction vessel.

The process of the invention, in a particularly preferred embodiment in general, comprises blending the carbonaceous material, finely ground, with a solvent to form a slurry. The slurry is then introduced, together with hydrogen, into the reaction vessel containing the hydrogenation catalyst, described more fully hereinbelow, and is maintained under normal hydrogenating pressures and temperatures. After hydrogenation, solids that are present can be removed from the product stream. The product stream is then stripped of solvent, the amount of the solvent so stripped being sufficient for recycle purposes for blending with additional amounts of carbonaceous material to form a slurry. The balance of the product stream, not recycled, may thereafter be subjected to distillation to obtain products of various boiling ranges. Some of the products are useful per se as fuels. The remainder can be further treated by conventional refining processes including cracking, hydrocracking, hydrotreating, and the like.

In an alternative embodiment of the invention, the slurry of solid carbonaceous material and solvent is predigested with hydrogen in the absence of catalyst.

The hydrogen predigestion pressure can be essentially the same, lower or greater than that employed during subsequent catalytic hydrogenation. A pressure within the range of about 100 to about 5000 pounds per square inch absolute (psia) (about 7 to about 350 kilograms per square centimeter) is preferred. The temperature employed during predigestion is essentially the same as that employed during catalytic hydrogenation, i.e., about 260° C. to about 538° C. The rate at which hydrogen is charged during predigestion of the slurry is usually lower than that employed during subsequent catalytic hydrogenation but is at least sufficient to maintain the desired pressure. However, the amount of hydrogen charged can be essentially the same or greater than that employed in the catalytic hydrogenation. A preferred rate of hydrogen addition during predigestion is about 1000 to about 5000 standard cubic feet (SCF) per barrel (about 178 to about 891 cubic meters per cubic meter) of carbonaceous charge stock slurry. The rate at which slurry is charged during predigestion may be essentially the same as that employed during the catalytic hydrogenation. However, the slurry rate during predigestion can be less than or greater than that employed during catalytic hydrogenation. The space velocity in the predigestion vessel can be about 0.1 to about 10.0 volumes of slurry per hour per volume of predigestion vessel (VHSV). The predigested slurry is thereafter used as charge stock to the reaction vessel.

The solid carbonaceous materials that can be used herein can have the following composition on a moisture-free basis:

|          | Weight Per Cent |              |
|----------|-----------------|--------------|
|          | Broad Range     | Normal Range |
| Carbon   | 45 – 95         | 60 – 92      |
| Hydrogen | 2.5 – 7.0       | 4.0 – 6.0    |
| Oxygen   | 2.0 – 45        | 3.0 – 25     |
| Nitrogen | 0.75 – 2.5      | 0.75 – 2.5   |
| Sulfur   | 0.3 – 10        | 0.5 – 6.0    |

The carbon and hydrogen content of the carbonaceous material will reside primarily in benzene compounds, multi-ring aromatic compounds, heterocyclic compounds, etc. Nitrogen is believed to be present primarily in chemical combination with the aromatic compounds. Some of the sulfur and oxygen is believed to be present in chemical combination with the aromatic compounds and some in chemical combination with inorganic elements associated therewith, for example, iron and calcium.

In addition to the above, the solid carbonaceous material being treated herein can also contain solid, primarily inorganic, compounds which will not be convertible to liquid product herein, which are termed as "ash," and are composed chiefly of compounds of silicon, aluminum, iron and calcium, with smaller amounts of compounds of magnesium, titanium, sodium and potassium. Although the ash content of a carbonaceous material treated herein is not critical, it will generally amount to less than 50 weight per cent, based on the weight of the moisture-free carbonaceous material, and more specifically will generally amount to about 0.1 to about 30 weight percent, usually about 0.5 to about 20 weight percent.

Anthracitic, bituminous and subbituminous coal, lignitic materials, and other types of coal products referred to in ASTM D-388 are exemplary of the solid carbonaceous materials which can be treated in accordance with the process of the present invention to produce upgraded products therefrom. Carboniferous material, such as oil shale and tar sands, can also be treated herein in place of the solid carbonaceous materials to obtain similar liquid hydrocarbons. When a raw coal is employed in the process of the invention, most efficient results are obtained when the coal has a dry fixed carbon content which does not exceed 86 percent and a dry volatile matter content of at least 14 percent by weight as determined on an ash-free basis. The coal, prior to use in the process of the invention, is preferably ground in a suitable attrition machine, such as a hammermill, to a size such that at least 50 percent of the coal will pass through a 40-mesh (U.S. Series) sieve. The ground coal is then dissolved or slurried in a suitable solvent. If desired, the solid carbonaceous material can be treated, prior to reaction herein, using any conventional means known in the art, to remove therefrom any materials forming a part thereof that will not be converted to liquid herein under the conditions of reaction.

Any liquid compound, or mixtures of such compounds, having hydrogen transfer properties can be used as solvent herein. However, liquid aromatic hydrocarbons are preferred. By "hydrogen transfer properties" we mean that such compound can, under the conditions of reaction herein absorb or otherwise take on hydrogen and also release the same. A solvent found particularly useful as a startup solvent in anthracene oil defined in Chamber's Technical Dictionary, MacMillan, Great Britain, 1943, page 40, as follows: "A coal-tar fraction boiling above 270° C. consisting of anthracene, phenanthrene, chrysene, carbazole and other hydrocarbon oils." Other solvents which can be satisfactorily employed are those which are commonly used in the Pott-Broche process. Examples of these are polynuclear aromatic hydrocarbons such as naphthalene and chrysene and their hyrogenated products such as tetralin (tetrahydronaphthalene), decalin, etc., or one or more of the foregoing in admixture with a phenolic compound such as phenol or cresol.

The selection of a specific solvent when the process of the present invention is initiated is not critical since a liquid fraction which is obtained during the defined conversion process serves as a particularly good solvent for the solid carbonaceous material. The liquid fraction which is useful as a solvent for the solid carbonaceous material, particularly coal, and which is formed during the process, is produced in a quantity which is at least sufficient to replace any solvent that is converted to other products or which is lost during the process. Thus, a portion of the liquid product which is formed in the process of the invention is advantageously recycled to the beginning of the process. It will be recognized that as the process continues, the solvent used initially becomes increasingly diluted with the liquid fraction derived from the process until the recycle stream contains essentially none of the original liquid solvent. If the process is operated on a semicontinuous basis, the solvent which is employed at the beginning of each new period may be that which has been obtained from a previous operation. For example, liquids produced from coal in accordance wtih the present invention are aromatic and generally have a boiling range of about 149° C. to about 760° C., a specific gravity of about 0.9 to about 1.1 and a carbon to hydrogen atomic ratio in the range of about 1.5:1 to about 0.66:1. A solvent oil obtained from a subbituminous coal, such as Wyoming-Montana coal, comprises a middle oil having a typical boiling range of about 191° C. to about 375° C. Thus, the solvent that is employed herein can broadly be defined as that obtained from a previous conversion of a carbonaceous solid material in accordance with the process defined herein. Although we have used the term "solvent", it is understood that such term covers the liquid wherein the liquid product obtained herein is dissolved as well as the liquid in which the solid materials are dispersed.

The ratio of solvent to solid carbonaceous material can be varied so long as a sufficient amount of solvent is employed to effect conversion of a substantial portion of the solid carbonaceous material in the reaction vessel. While the weight ratio of solvent to solid carbonaceous material can be within the range of about 0.6:1 to about 9:1, a range of about 1:1 to about 4:1 is preferred. Best results are obtained when the weight ratio of solvent to solid carbonaceous material is about 2:1. Ratios of solvent to solid carbonaceous material greater than about 4:1 can be used but provide little significant functional advantage in dissolving or slurrying the solid carbonaceous material for use in the process of this invention. An excessive amount of solvent is undesirable in that added energy or work is required for subsequent separation of the solvent from the system.

In accordance with the present invention, the slurry and hydrogen are maintained at a temperature between about 260° C. and about 538° C., at a pressure between about 500 and about 10,000 pounds per square inch absolute (about 35 to about 700 kilograms per square centimeter), and preferably at a pressure between about 1500 and about 4000 psia (about 105 to about 280 kilograms per square centimeter), utilizing a weight hourly space velocity (WHSV) between about 0.25 and about 50 kilograms of solid carbonaceous material per kilogram of catalyst per hour, and added hydrogen in amounts between about 2000 and about 20,000 standard cubic feet (SCF) per barrel (about 356 to about 3560 cubic meters per cubic meter) of slurry. The exact conditions selected will depend, for example, upon the catalyst, the particular charge stock to be treated, and the degree of conversion desired. It is desirable to utilize as low a temperature as possible and still obtain the desired results. This is due to the fact that undesirable side reactions, such as coke formation, are promoted by high temperatures. Thus, if the hydrogenation catalyst is maintained at an unnecessarily high temperature, its effective life is decreased. The hydrogen recycle rate does not vary significantly with various charge stocks and preferably should be between about 2000 and about 10,000 standard cubic feet per barrel (about 356 to about 1780 cubic meters per cubic meter) of slurry.

Any hydrogenation catalyst well-known to those having ordinary skill in the art can be employed herein, but preferably the catalyst which is employed in the process of the invention comprises at least one hydrogenating component selected from the group consisting of the metals, metal sulfides and/or metal oxides of Groups VI and VIII of the Periodic Table. Particularly preferred among the hydrogenating metals are nickel, cobalt, molybdenum and tungsten. Particularly desirable catalysts comprise (a) a combination of about 2 to about 25 percent (preferably about 4 to about 16 percent) by weight molybdenum and at least one of the iron group metals where the iron group metals are present in such amounts that the atomic ratio of the iron group metals with respect to molybdenum is less than about 1.0 and (b) a combination of about 5 to about 40 percent (preferably about 10 to about 25 percent) by weight of nickel and tungsten where the atomic ratio of tungsten to nickel is about 0.1:1 to about 5:1 (preferably about 0.3:1 to about 4:1), said hydrogenating component being composited with a porous support. These Group VI and Group VIII catalysts can employ promoters at levels not in excess of about eight percent, but preferably lower than about five percent. The best promoters are the elements of Groups II and IV. The most preferred ones are Ti, Zr, Sr, Mg, Zn and Sn. Catalysts of type (a) may contain molybdenum in the amounts conventionally used, i.e., about 2 to about 25 percent molybdenum based on the total weight of the catalyst including the porous carrier. Smaller amounts of molybdenum than about 2 percent may be used, but this reduces the activity. Larger amounts than about 25 percent can also be used but do not increase the activity and constitute an extra expense. The amounts of the iron group metals in (a) and (b) may be varied as long as the above proportions are used. However, in (a) we prefer to utilize two iron group metals, each in an atomic ratio to molybdenum between about 0.1 and about 0.2. All of the iron group metals may be present but we prefer to use only two. However, only one iron group element is employed when a Group IVB promoter is used. The amount of the hydrogenating component based on the metal itself can suitably be from about 0.5 to about 40 percent by weight of the catalyst including the porous carrier, but is usually within the range of about 2 to about 30 percent by weight of the catalyst including the carrier. When using a catalyst of type (a), we prefer to utilize one containing about 4 to about 16 percent by weight molybdenum, most preferably about 8 percent; about 0.2 to about 10 percent by weight nickel, most preferably about 0.5 percent; and about 0.5 to about 5 percent by weight cobalt, most preferably about 1.0 percent. When using a catalyst of type (b), we prefer to utilize one containing about 15 to about 25 percent (e.g., about 19 percent) tungsten and about 2 to about 10 percent (e.g., about 6 percent) nickel supported on a porous carrier, such as alumina.

The above-mentioned active hydrogenating components can also be present as mixtures. On the other hand, chemical combinations of the iron group metal oxides or sulfides with the Group VI oxide and/or sulfide can also be utilized. The catalytic hydrogenating components can be used with a variety of highly porous bases or supports which may or may not have catalytic activity of their own. Examples of such supports are alumina, bauxite, silica gel, kieselguhr, thoria, zirconia, molecular sieves or other zeolites, both natural and synthetic, or mixtures of the foregoing, as long as the particular catalyst support which is employed has pores sufficiently large to avoid quick plugging by the deposition of the ash and/or organo-metallic constituents of the coal used as charge stock. By "highly porous" and "pores sufficiently large" is meant a pore volume of from about 0.1 to about 1.0 cc. per gram, preferably from about 0.25 to about 0.8 cc. per gram; a surface area from about 50 to about 450 m$^2$/gram, preferably from about 80 to about 300 m²/gram; a pore radius size range (as measured with N₂) from about 10 A to about 300 A with the average pore radius being from about 20 A to about 150 A. The catalyst will be more fully described hereinafter.

When treating a carbonaceous material, such as a coal slurry, according to the process of the invention, it is customary to continue the reaction until the catalyst activity has decreased markedly due to the deposition of ash and/or coke or other carbonaceous material thereon. When regeneration of the catalyst becomes necessary, the catalyst can be regenerated by combustion, i.e., by contact with an oxygen-containing gas such as air at an elevated temperature usually about 482° C. or by any other means normally used to regenerate hydrogenation catalysts. The manner in which the catalyst is regenerated does not constitute a portion of the present invention.

BRIEF DESCRIPTION OF THE DRAWINGS

Referring to FIG. 1, a carbonaceous solid material, such as raw coal, is introduced into coal preparation unit 10 through line 8. In coal preparation unit 10, the coal is ground by a suitable attrition machine, such as a hammermill to a size, for example, such that 50 percent of the coal will pass through a 40 mesh sieve (U.S. Series). Ground coal particles are transferred from coal preparation unit 10 through line 12 into a slurry blending unit 14 where the coal is mixed with a solvent in a weight ratio of solvent to coal of about 1:1 to about 4:1. When the process is initiated, fresh solvent, such as anthracene oil, is introduced into slurry blending unit 14 through line 16. As the process continues, a sufficient amount of solvent oil is produced so that fresh solvent is gradually replaced by recycle solvent oil which is introduced into slurry blending unit 14 through line 18. If desired, all or a portion of the solvent can be passed through line 20 to line 12 to aid in transferring ground coal to slurry blending unit 14. A slurry of coal particles and solvent is removed from slurry blending unit 14 through line 22, where it is mixed with high pressure hydrogen supplied through line 24. The mixture of coal, oil and hydrogen is then introduced into the bottom of reaction vessel 26. If desired, the oil-coal mixture can be preheated by any suitable heat exchange means (not shown) prior to being introduced into reaction vessel 26. While the mixture of coal, solvent and hydrogen is shown as being introduced into the bottom of reaction vessel for upflow operation, the mixture can be introduced into the top of reaction vessel 26 for downflow operation. The mixture of coal, solvent and hydrogen is introduced into reaction vessel 26 and passed through reaction vessel 26 in a flooded-bed type reaction system. While the hydrogen is shown as being introduced with the coal and solvent into the bottom of reaction vessel 26, the hydrogen can be introduced at multiple places throughout the reaction vessel. Similarly, some of the coal and/or solvent can be introduced at multiple places throughout the reactor.

The hydrogen is introduced into reaction vessel 26 in amounts between about 2,000 and about 20,000 standard cubic feet of hydrogen per barrel (about 356 to about 3560 cubic meters per cubic meter) of coal slurry. The hydrogen gas stream is preferably at least about 60 percent hydrogen, the remainder of the gas stream being gases such as nitrogen, carbon monoxide, carbon dioxide and/or low molecular weight hydrocarbons, such as methane. The exact reaction conditions in reaction vessel 26 depend upon a number of factors, for example, the amount of liquefaction desired, but, in general, include temperatures of about 260° to about 538° C., usually temperatures between about 371° and about 454° C., and pressures of about 500 to about 10,000 pounds per square inch absolute (about 35 to about 700 kilograms per square centimeter), usually pressures between about 1500 and about 4000 pounds per square inch absolute (about 70 to about 280 kilograms per square centimeter). The weight hourly spaced velocity of the coal slurry is suitably from about 0.25 to about 40, usually about 0.5 to about 20 kilograms of charge stock per kilogram of catalyst per hour. The gas flow rate is maintained at a velocity substantially above laminar flow; that is, the modified Reynolds number $N'_{Re}$, assuming for calculational purposes that the gas is essentially the only medium flowing through the reactor void volume (defined hereinbelow), is substantially greater than 10, as this number is defined in "Perry's Chemical Engineer's Handbook", McGraw-Hill, New York, 4th Edition, 1967, pages 5–50 and 5–51. Generally, $N'_{Re}$ should be > 100, preferably > 500.

The catalyst 28 can be any hydrogenation catalyst as defined hereinabove, but the catalytic components thereof are preferably composed of molybdenum, nickel and cobalt or titanium combined with a carrier, such as alumina, and the catalyst substantially fills the space in reaction vessel 26 between a supporting grid 30 and a retaining screen 32. It is imperative in the practice of this invention that the catalyst be such that, when supported in place, the reactor void volume in the reaction bed be within defined critical limits in order to obtain the desired hydrogenation without appreciably increasing the pressure drop across the catalyst bed. By "reactor void volume" we mean the percent free gas space, exclusive of the pores in the catalyst particles, lying between grid 30 and screen 32. We have thus found that the reactor void volume must be from about 40 to about 90 volume percent, preferably about 50 to about 80 volume percent of the catalyst bed.

Figure 1:
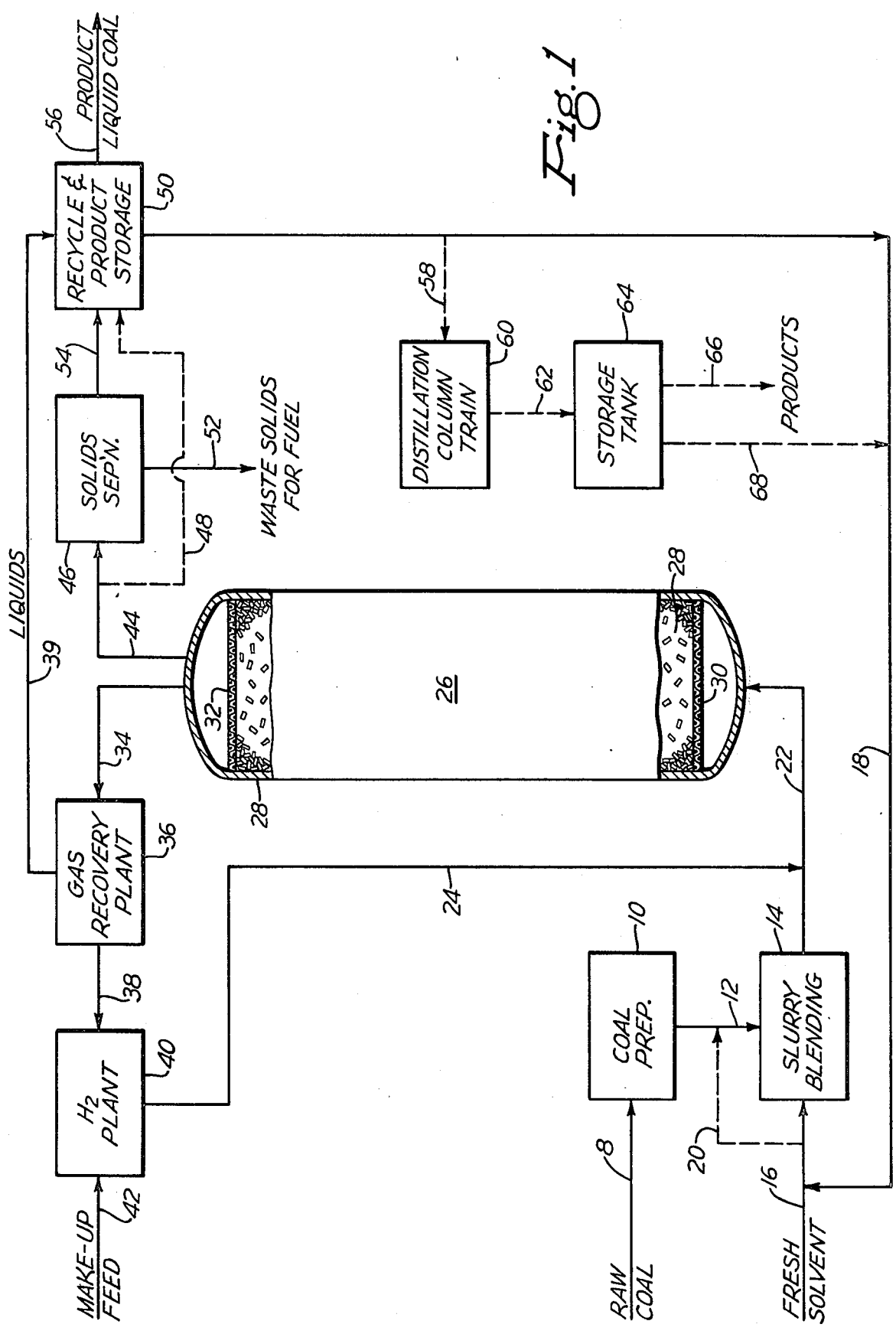
FIG. 1 is a schematic flow diagram of one embodiment of the invention showing a reaction vessel containing one of the specific catalysts used herein.
Figure 2:
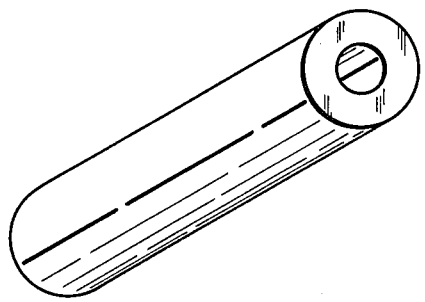
FIGS. 2 to 7 illustrate typical catalyst shapes that can be used in the process defined herein. In addition to the catalyst shapes shown in FIGS. 2 to 7, the catalyst can assume the shapes of Berl and Intalox saddles and Raschig rings.
Figure 3:
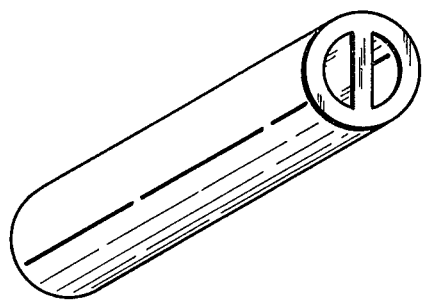
Figure 4:
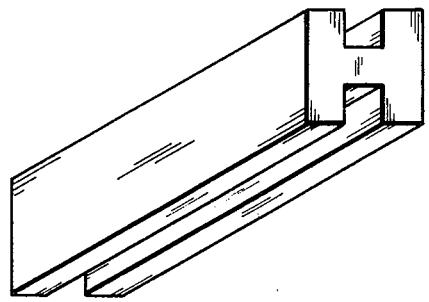
Figure 5:
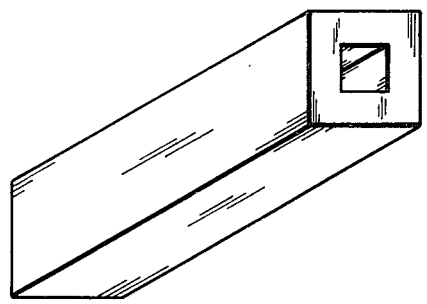
Figure 6:
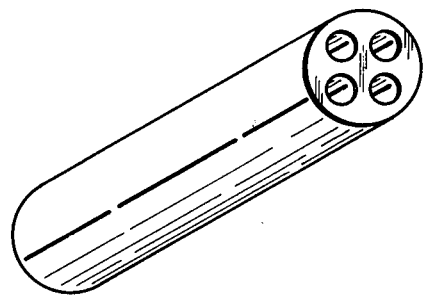
Figure 7:
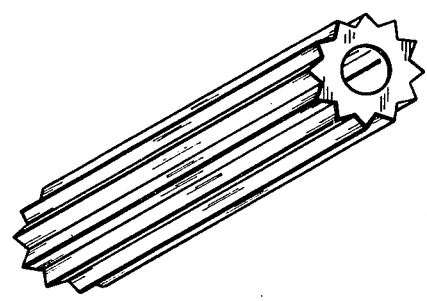

The catalyst employed can be of any suitable shape that when indiscriminately mounted in the reaction vessel will suffice to provide the reactor void volume defined above and whose greatest or maximum wall thickness is within a range of about 1/32 to about ½ inch (about 0.079 to about 1.27 centimeters), preferably about 1/32 to about ¼ inch (about 0.079 to about 0.64 centimeters). By "wall thickness" we mean the thickness of the least thick portion of the catalyst particle cross section, excluding protrusions, for example, the points of a star. Thus, for example, in FIG. 2, the wall thickness would be one half the difference between the inner and outer particle diameter. In FIG. 5, the wall thickness would be one half the difference between the lengths of the sides of the inner and outer squares. For FIG. 7, the wall thickness would be one half the difference between the inner diameter and the diameter corresponding to the troughs between the points of the star. Wall thickness for other cases will be apparent from these examples to one skilled in the art. If a catalyst particle is provided with an opening extending therethrough, for example, a cylinder, which herein is a preferred embodiment, the opening therein can have a width of about 1/16 to about one inch (about 0.16 to about 2.54 centimeters), preferably about ⅛ to about ½ inch (about 0.32 to about 1.27 centimeters). The length to outer diameter (L/D) of such cylinders must be within a range of about 0.1:1 to about 5:1, preferably about 0.3:1 to about 2:1. The catalyst base, for example, can, as noted, be made into any desired shape and then impregnated or otherwise coated with the catalytic components in any suitable or convenient manner, or the base and catalytic components can be mixed together and then extruded or compacted into any suitable shape to provide the defined reactor void space when in use. Suitable catalyst shapes are exemplified in FIGS. 2 to 7. In reaction vessel 26 the catalyst particles are those shown in FIG. 2.

In accordance with the process defined and claimed herein, the coal in the slurry is effectively hydrogenated and converted to desired product in high yields and yet, surprisingly, though the present process involves the use of a fixed catalyst bed and the slurry is obviously composed of a substantial amount of solids and, in most cases, for example, when using a coal containing ash, not all the solids will be converted to liquid product, we have not encountered an appreciable pressure drop across the catalyst bed nor undesirable attrition of the individual catalyst particles.

Gases from reaction vessel 26 are removed through line 34 to a gas recovery plant 36. Gas recovery plant 36 comprises any suitable means for separating gases from liquids. The gases separated in gas recovery plant 36 are passed through line 38 to a hydrogen plant 40 where hydrogen is recovered and any low molecular weight hydrocarbon gases are converted to hydrogen. Any liquids in gas recovery plant 36 can be removed therefrom by line 39 and passed to recycle and product storage 50. Depending upon economic considerations, the low molecular weight hydrocarbon gases can be sold and hydrogen generated by other satisfactory means, such as gasification of coal, or a product stream containing undesirable materials, such as high-boiling tars or waste solids, can be used as a hydrogen source. Hydrogen is then returned through line 24 to reaction vessel 26. Any make-up feed which is needed to supply hydrogen for the hydrogen plant is added through line 42. Liquid products containing some solid materials are removed from reaction vessel 26 through line 44 into a solids separation unit 46. If desired, solids separation unit 46 can be bypassed, for example, when substantially no solid materials are in the liquefied product, in which case the liquid products removed from reaction vessel 26 can be passed directly by line 48 to a product storage and recycle unit 50. Solids separation unit 46 comprises any suitable means for separating solids from liquids, such as a continuous rotating filter, centrifuge or liquid cyclone. Solid materials are removed from the separation unit 46 through line 52. If the solid materials removed by line 52 contain some of the original carbonaceous materials, as in the case wherein it is desired not to solubilize all of the original carbonaceous material, and solid inorganic material, the two can be separated from each other by any means convenient in the art. The solid carbonaceous material will be upgraded, for example, be lower in sulfur content than the original charge, and can be used as fuel. The inorganic materials, for example, ash, can be used, as recovered or after calcination, along or in combination with another hydrogenation catalyst different from that present in the catalyst bed in reaction vessel 26, as additional catalyst and introduced into the system along with the charge in line 22. In such case, the catalyst bed in reaction vessel 26 will contain additional catalyst to the extent of such addition. However, such additional catalyst is not considered when calculating reactor void volume.

The liquid product is removed from separation unit 46 through line 54 to product storage and recycle unit 50, from which liquid product can be removed through line 56. A portion of the liquid product is recycled as solvent through line 18 and returned to slurry blending unit 14. Optionally, the liquid product from storage and recycle unit 50 can be sent through line 58 to a distillation column train 60 where various cuts can be removed at desired pressure, usually under vacuum, for the recovery of specific distillation cuts which can then be passed through line 62 to a storage tank farm 64. The various products can then be removed through line 66. In this manner specific solvent cuts can be removed and recycled as solvent through line 68 to slurry blending unit 14. It is believed obvious to those having ordinary skill in the art that by varying the reaction conditions in reaction vessel 26, but within the range of conditions set forth above, more or less hydrocracking can occur, which would give more or less liquefied product and/or more or less lighter boiling products for distillation in distillation column train 60. It is also within the purview of the disclosure herein that product in line 44 containing solids be sent directly to a distillation column train wherein the component parts thereof can be separated into selected fractions.

DESCRIPTION OF THE PREFERRED EMBODIMENTS

The process of this invention can be illustrated by the following:

EXAMPLE I

A 40 weight per cent slurry of bituminous coal with solvent oil was prepared by mixing 40 parts by weight of crushed (average of about 100 mesh sieve [U.S. Series]) Big Horn subbituminous coal with 60 parts by weight of anthracene oil. 794 grams of catalyst were housed in a reactor having an internal diameter of two and three-eights inches (6.03 centimeters) to form a catalyst bed therein having a depth of 26.8 inches (68.1 centimeters). The catalyst shape was similar to that shown in FIG. 2 and had an outer diameter of 5.6 millimeters (7/32 inch), an inner diameter of 2.4 millimeters and an average length of 19 millimeters (¾ inch). The total catalyst bed volume was 1960 cubic centimeters, while the total reactor volume occupied by the solid portion of the individual catalyst particles therein not excluding the pores thereof, was 751 cubic centimeters, thus resulting in a reactor void volume of 61.7 volume percent. The catalyst was composed of alumina carrying on the surface thereof 9.5 percent by weight of a three-metal catalytic component. The catalytic component consisted of 1.0 weight percent of cobalt, 0.5 weight percent of nickel and 8.0 weight percent of molybdenum. The slurry, together with hydrogen, was charged upwardly through the catalyst bed at a temperature of 410° C. to 417° C. and a pressure of 3500 pounds per square inch gauge (246 kilograms per square centimeter gauge). The hydrogen feed rate was 1781 cubic meters per cubic meter (10,000 standard cubic feet per barrel) of slurry. The design coal slurry feed rate was 1.8 kilograms (3.96 pounds) per hour, which resulted in a weight hourly spaced velocity of 0.9 kilograms of coal per hour per kilogram of catalyst in the reactor. The run was continued for 60 hours and the filtrate obtained upon separation of solids from the hydrogenated product was analyzed. The results obtained are tubulated below in Table I:

Table I

| Elemental Analysis, Weight Per Cent | Feed Slurry, Dry Basis | Filrate Resulting from Hydrogenation |
|---|---|---|
| Carbon | 82.60 | 89.39 |
| Hydrogen | 5.63 | 8.42 |
| Nitrogen | 1.10 | 0.67 |
| Oxygen | 7.63 | 1.46 |
| Sulfur | 0.58 | 0.06 |
| Ash | 2.46 | Nil |

The percent solvation in the above run was 92.0 percent.

$$\text{Per Cent Coal Solvation} = 100 \times \frac{\text{Weight of MAF Coal Feed} - \text{Weight of MAF Coke}}{\text{Weight of MAF Coal Feed}}$$

where MAF = moisture and ash free.

The above shows that excellent coal solvation and reduction in coal impurities was still being obtained at the end the 60-hour run period.

EXAMPLE II

A second run similar to that of Example I was carried out wherein the catalyst was of somewhat different dimensions [9.5 millimeters (⅜ inch) outer diameter, 4.8 millimeters (3/16 inch) inner diameter and a length of 19 millimeters (¾ inch)], but carried the same catalytic metals in the same relative amounts. The catalyst bed volume was 2050 cubic centimeters while the total reactor volume occupied by the solid portions of the individual catalyst particles therein, not excluding the pores thereof, was 751 cubic centimeters, thus resulting in a reactor void volume of 63.4 volume percent. The slurry, together with hydrogen, was charged upwardly through the catalyst bed at a temperature of 409° C. to 420° C. and a pressure of 3500 pounds per square inch gauge (246 kilograms per square centimeter gauge). The hydrogen feed rate was 1781 cubic meters per cubic meter (10,000 standard cubic feet per barrel) of slurry. The design coal slurry feed rate was 3.37 kilograms per hour (7.42 pounds per hour), which resulted in a weight hourly space velocity of 1.7 kilograms of coal per hour per kilogram of catalyst in the reactor. The run was continued for 156 hours, and the filtrate obtained upon separation of solids from the hydrogenated product was analyzed. The results obtained are tabulated below in Table II:

Table II

| Elemental Analysis, Weight Per Cent | Feed Slurry, Dry Basis | Filtrate Resulting from Hydrogenation |
|---|---|---|
| Carbon | 82.60 | 89.93 |
| Hydrogen | 5.63 | 6.55 |
| Nitrogen | 1.10 | 0.95 |
| Oxygen | 7.63 | 2.19 |
| Sulfur | 0.58 | 0.38 |
| Ash | 2.46 | Nil |

The percent solvation in the above run was 71.4 percent.

Although the results in Table II are not as good as those in the shorter run of Example I, it is believed that this is due in part to the much higher feed rate and in part to the accumulation of coke particles therein, resulting in deactivation of the catalyst. Since there was no appreciable increase in pressure drop across the catalyst bed during the run, however, it is believed that an increase in hydrogen flow with a resultant increased agitation in the catalyst bed would remove such particles from the catalyst bed and permit much longer reaction periods.

Obviously, many modifications and variations of the invention, as hereinabove set forth, can be made without departing from the spirit and scope thereof, and therefore only such limitations should be imposed as are indicated in the appended claims.

We claim:

1. In a process wherein a slurry composed of a solid carbonaceous material and a solvent having hydrogen transfer properties and hydrogen are contacted with a hydrogenation catalyst to convert said solid carbonaceous material to a liquid, the improvement which comprises passing said slurry under hydrogenation conditions through the void spaces of a fixed catalyst bed composed of said hydrogenation catalyst, the catalyst particles of said catalyst having a maximum wall thickness in the least thick portion thereof of about 1/32 to about ½ inch, said catalyst bed having a reactor void volume of about 50 to about 90 volume percent.

2. The process of claim 1 wherein said maximum wall thickness is about 1/32 to about ¼ inch.

3. The process of claim 1 wherein said reactor void volume is about 50 to about 80 volume percent.

4. The process of claim 1 wherein the catalyst particle is provided with an opening extending therethrough having a width of about 1/16 to about one inch.

5. The process of claim 4 wherein the catalyst particle is provided with an opening extending therethrough having a width of about ⅛ to about ½ inch.

6. The process of claim 4 wherein the length to outer diameter of said catalyst particle is in the range of about 0.1:1 to about 5:1.

7. The process of claim 6 wherein the length to outer diameter of said catalyst particle is in the range of about 0.3:1 to about 2:1.

8. The process of claim 1 wherein the solid carbonaceous material is a coal.

9. The process of claim 6 wherein said coal is selected from the group consisting of bituminous, subbituminous and lignite coals.

10. The process of claim 1 wherein said solvent is selected from the group consisting of liquids produced in the reaction vessel, anthracene, phenanthrene, naphthalene, chrysene, carbazole, tetralin and mixtures thereof alone and in combination with a phenolic compound selected from the group consisting of phenol and cresol.

11. The process of claim 1 wherein the hydrogenating component of the catalyst is a sulfided combination of Group VI and VIII elements.

12. The process of claim 1 wherein the hydrogenating component of the catalyst is a sulfided combination of molybdenum, nickel and cobalt.

* * * * *